United States Patent
Swider et al.

(10) Patent No.: US 7,475,520 B2
(45) Date of Patent: Jan. 13, 2009

(54) TRAY POSITIONING DEVICE FOR STACKING OF PRODUCT

(75) Inventors: John Swider, Port Crane, NY (US); Michael E. Caporali, Endicott, NY (US); Thomas Arnold, Owego, NY (US); Eric Reisenauer, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 288 days.

(21) Appl. No.: 11/097,277

(22) Filed: Apr. 4, 2005

(65) Prior Publication Data

US 2006/0180435 A1    Aug. 17, 2006

Related U.S. Application Data

(63) Continuation-in-part of application No. 11/058,178, filed on Feb. 16, 2005.

(51) Int. Cl.
*B65B 57/00* (2006.01)
*B65B 5/10* (2006.01)
*B65B 35/10* (2006.01)

(52) U.S. Cl. .............. 53/55; 53/67; 53/531; 53/540; 53/542; 53/244; 53/249; 53/259; 198/463.3; 271/207; 271/213; 414/794; 414/794.4

(58) Field of Classification Search ............ 53/542, 53/201, 540, 531, 535, 443, 475, 244, 245, 53/249, 259, 55, 64, 67; 198/463.3; 271/207, 271/213; 414/794, 794.4
See application file for complete search history.

(56) References Cited

U.S. PATENT DOCUMENTS

| | | | |
|---|---|---|---|
| 2,704,614 A | * | 3/1955 | St. John ................. 414/415 |
| 2,888,126 A | | 5/1959 | Feige et al. |
| 3,291,329 A | * | 12/1966 | Ord ........................ 414/420 |
| 3,486,296 A | * | 12/1969 | Hechenleitner .......... 53/534 |
| 3,890,764 A | * | 6/1975 | Hartman ................. 53/500 |
| 3,937,456 A | * | 2/1976 | Gruodis et al. ........... 271/278 |
| 4,013,183 A | | 3/1977 | Milholen et al. |
| 4,019,640 A | * | 4/1977 | Marin et al. ............. 414/790 |
| 4,051,957 A | | 10/1977 | Parups |
| 4,364,553 A | | 12/1982 | Wilson |
| 4,397,599 A | | 8/1983 | Sabel |
| 4,518,160 A | * | 5/1985 | Lambrechts et al. ...... 271/214 |
| 4,757,890 A | | 7/1988 | Motoda |
| 4,856,263 A | | 8/1989 | Schneider et al. |
| 4,979,870 A | | 12/1990 | Mojden et al. |
| 5,101,963 A | | 4/1992 | Skarlupka et al. |
| 5,301,788 A | | 4/1994 | Hironaka et al. |
| 5,318,401 A | | 6/1994 | Mandel |
| 5,347,790 A | | 9/1994 | Romanenko et al. |

(Continued)

FOREIGN PATENT DOCUMENTS

EP    352841 A1 *  1/1990

*Primary Examiner*—Stephen F Gerrity
(74) *Attorney, Agent, or Firm*—Greenblum & Bernstein, P.L.C.

(57) ABSTRACT

A system and method designed to position a tray for either horizontal stacking or vertical stacking of product. The system includes a stationary conveyor and a tray carriage in a tray transportation path with the conveyor. The tray carriage is moveable between an elevated, horizontal position and an inclined position. Guides are located near the tray carriage to guide the tray carriage into the inclined position.

26 Claims, 6 Drawing Sheets

U.S. PATENT DOCUMENTS

| | | | |
|---|---|---|---|
| 5,661,949 A * | 9/1997 | Blanc ........................ 53/244 |
| 5,692,877 A | 12/1997 | Sixtensson |
| 5,778,640 A * | 7/1998 | Prakken et al. ............... 53/475 |
| 5,909,796 A | 6/1999 | Soldavini |
| 6,105,751 A | 8/2000 | Jentjens et al. |
| 6,168,366 B1 | 1/2001 | Horn et al. |
| 6,220,420 B1 | 4/2001 | Jan et al. |
| 6,220,424 B1 | 4/2001 | Fluck |
| 6,238,165 B1 * | 5/2001 | Fletcher et al. ............ 414/422 |
| 6,257,821 B1 | 7/2001 | Ward et al. |
| 6,328,302 B2 * | 12/2001 | Hendrickson et al. ....... 271/207 |
| 6,390,278 B1 | 5/2002 | Brown |
| 6,516,934 B2 | 2/2003 | Masciarelli, Jr. |
| 6,536,191 B1 | 3/2003 | Ruggiero |
| 6,543,622 B1 | 4/2003 | Fridman |
| 6,578,700 B2 | 6/2003 | Smith et al. |
| 6,579,053 B1 | 6/2003 | Grams et al. |
| 6,591,965 B2 | 7/2003 | Smith et al. |
| 6,619,464 B2 | 9/2003 | Peppel et al. |
| 6,694,706 B1 * | 2/2004 | Odenthal et al. .............. 53/443 |
| 6,695,302 B1 | 2/2004 | Lamothe |
| 7,032,738 B2 | 4/2006 | Tonnigs et al. |
| 7,033,130 B2 | 4/2006 | Watson et al. |
| 7,096,650 B2 * | 8/2006 | Van Dam ..................... 53/540 |
| 7,137,234 B2 * | 11/2006 | Caporali et al. ............... 53/433 |
| 2005/0220580 A1 * | 10/2005 | Arnold et al. ............... 414/414 |

* cited by examiner

TRAY POSITIONING DEVICE FOR STACKING OF PRODUCT

CROSS REFERENCE TO RELATED APPLICATIONS

This application is a continuation in part of co-pending application Ser. No. 11/058,178 filed on Feb. 16, 2005, which is incorporated herein in its entirety.

FIELD OF THE INVENTION

The invention generally relates to a tray positioning device and method of use and, more particularly, to a tray positioning device to stack product in a tray in either a horizontal orientation or vertical orientation and method of use.

BACKGROUND DESCRIPTION

The sorting of mail is a very complex, time consuming task. In general, the sorting of mail is processed through many stages, including back end processes, which stack mail pieces in a tub or container in delivery order sequence. These processes can either be manual or automated, depending on the mail sorting facility, the type of mail to be sorted such as packages, flats, letters and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced tray conveyors, flat sorters, stacking devices and the like. As a result of these developments, postal facilities have become quite automated over the years, considerably reducing overhead costs and increasing mail throughput.

By way of example, in front end processes, sorting and sequencing systems are capable of sequencing mail pieces and other product based on a two pass algorithm system. Of course, other known systems can equally be used to sort mail pieces and other product, a host of them readily available and known to those of ordinary skill in the art. As the mail pieces are ejected from the system, after being sorted or sequenced, they may be manually placed into a container. However, this manual process is very time consuming, costly and error prone.

In some applications, the mail pieces may be fed automatically into a tray or tub. However, these known systems are designed only to place the mail pieces in one orientation and thus do not exhibit the flexibility needed by the ever evolving requirements of the United States Postal System (USPS). For example, in one known device, the mail pieces or other product are unloaded to containers located at each drop off point, via chutes. In this manner, the mail pieces are slid down the chutes into the containers and are stacked within the containers in a horizontal orientation.

Although these horizontal automation systems have provided many benefits, they still lack the required flexibility to stack product in a vertical orientation, a requirement that may become essential by the ever increasing demands of the USPS e.g., the need for both horizontal and vertical stacking. In fact, there is no known single machine that is capable of meeting such requirements of the USPS. Thus, currently known systems cannot provide the required design flexibility to enhance the productivity and overall evolving efficiencies demanded by the postal system and other customers.

The invention is directed to overcoming one or more of the problems as set forth above.

SUMMARY OF THE INVENTION

In a first aspect of the invention, a system for positioning a tray includes a stationary conveyor for transporting the tray. A tray carriage is in a tray transportation path with the conveyor. The tray carriage is moveable from a lowered position to an elevated position and an inclined position for stacking product in a horizontal orientation or a vertical orientation, respectively, in the tray.

In a another aspect of the invention, the system includes a stationary conveyor and a tray carriage moveable from a nested position with respect to the conveyor to either a raised, horizontal position to stack the product in a horizontal orientation in the tray or a raised, inclined position to stack the product in an inclined orientation in the tray. At least one raised mechanism is provided for at least registering the tray on the tray carriage.

In another aspect of the invention, a method of stacking product in either a horizontal orientation or a vertical orientation is provided. If stacking is to be in the horizontal orientation then the following steps are performed:
  elevating a tray from a start position to a raised, horizontal position;
  inducting the product into the tray; and
  lowering the tray to the start position when the product within the tray meets a predetermined criteria.

If stacking is to be in the vertical orientation, then the following steps are to be performed:
  elevating a tray into the raised, horizontal position;
  rotating the tray into a lowered, incline position;
  inducting product into the tray;
  raising the tray into the raised, horizontal position when the product within the tray meets the predetermined criteria; and
  lowering the tray to the start position.

BRIEF DESCRIPTION OF THE DRAWINGS

The foregoing and other aspects and advantages will be better understood from the following detailed description of embodiments of the invention with reference to the drawings, in which.

DETAILED DESCRIPTION OF EMBODIMENTS OF THE INVENTION

The invention is directed to a tray positioning device designed to orient a tray for stacking product therein in either a vertical orientation or a horizontal orientation. The product may be, for example, flats and other mail items (i.e., letters), for future delivery or warehousing or the like. The invention significantly reduces machine costs by allowing a single machine to stack product in delivery point sequence, in embodiments, in a vertical orientation or a horizontal orientation. Other applications such as warehousing and storage applications are also contemplated for use with the invention.

In one aspect of the invention, the system contains two degrees of freedom in motion:
(i) Rotating a tray carriage to an inclined position for vertical stacking operations. In this operational stage, the system of the invention allows stacking of product in a vertical orientation, for example; and
(ii) Raising a tray carriage to a delivery belt which sets a height and orientation of the tray for horizontal stacking operations. In this operational stage, the system of the invention allows stacking of product in a horizontal orientation, for example.

The tray positioning device can easily be switched between operational stages and may be modular. That is, the positioning device can be retrofitted to back end systems of known sequencing systems, without affecting the sorting and sequencing operations.

For both horizontal and vertical stacking of product in the tray, the tray is indexed onto a carriage system, and registered by a stop or other mechanism. The tray is lifted to a height of a delivery belt for induction of product into the tray, in either a horizontal or vertical orientation. In either orientation, the conveyor will remain stationary, while the tray carriage system is either raised into a horizontal position or raised and rotated into an inclined position for horizontal or vertical stacking of product, respectively, in a tray. Additionally, features of the invention are designed to ensure that the tray remains substantially stationary, will not topple or rotate, and that the product remains within the tray during processing.

Tray Positioning System of the Invention

Figure 1:
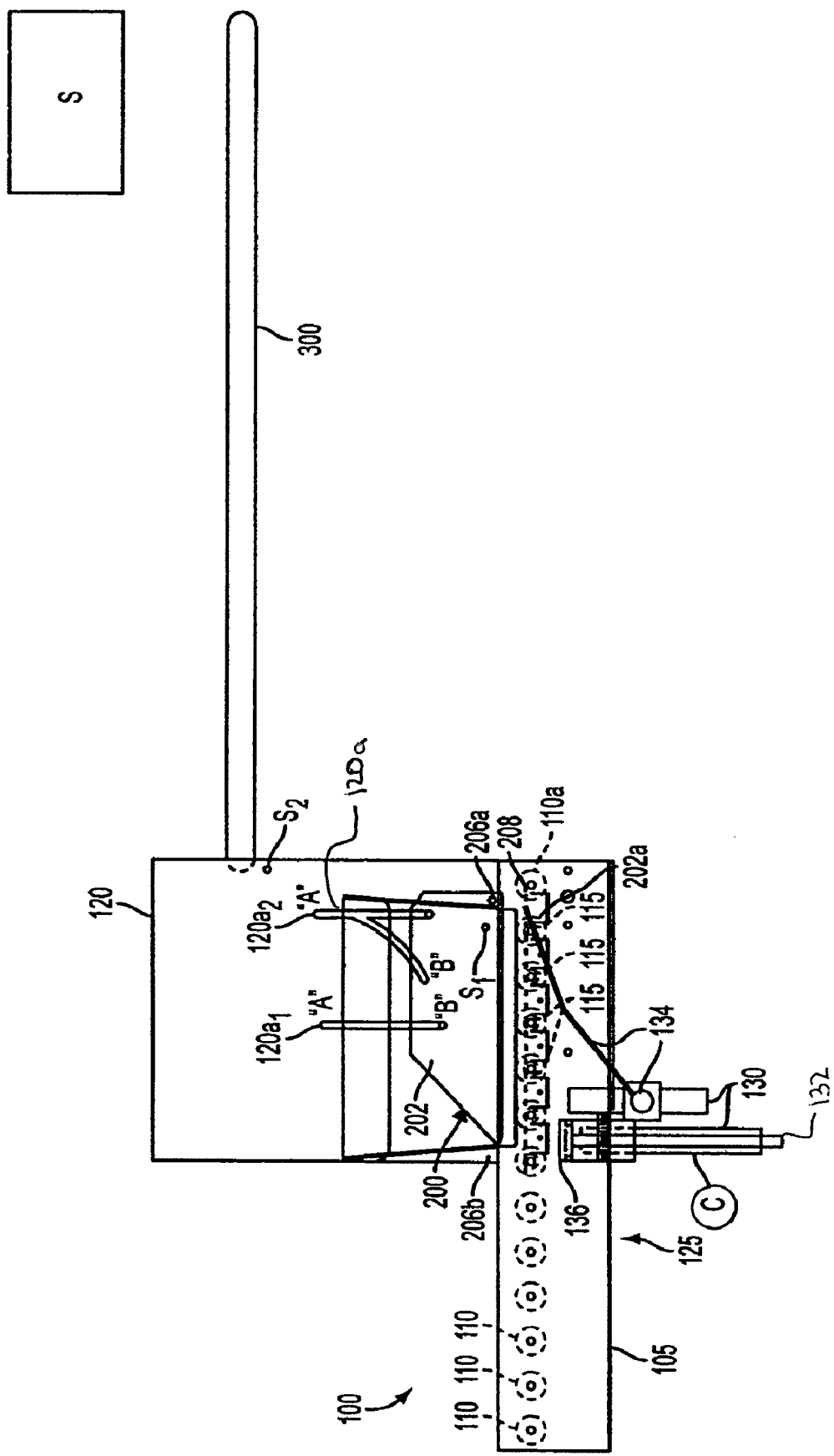
FIG. 1 shows the tray positioning device in a first position in accordance with the invention.

FIG. 1 shows a tray positioning device in a first position. In the embodiment of FIG. 1, the tray positioning device is generally depicted as reference numeral 100 and includes a conveyor 105 having power rollers 110. The power rollers 110 may include segmented rollers 115 and a single raised, power roller 110a. A separate delivery belt 300 is positioned proximate to the tray positioning device 100 and, in embodiments, is positioned at a predetermined height above the tray positioning device 100. A sorting or sequencing machine "S" is in the feed path of the delivery belt 300 such that product can be inducted onto the delivery belt 300 and transported to a tray. In embodiments, the belt 300 may be driven between 0.24 m/s and 2.0 m/s; although, other speeds are also contemplated by the invention.

The tray positioning device 100 further includes a frame member 125, which is preferably a module frame member capable of being retrofitted to any known tray conveyor system or sequencing device, as a back end system. An actuator assembly, generally depicted as reference numeral 130, is mounted to the frame member 125 and is designed to move a tray carriage 200 into any of the positions shown in FIGS. 1-6. The tray carriage 200 is positioned over the segmented rollers 115 and adjacent the single power roller 110a, positioned at an exit of the tray carriage 200.

Figure 3:
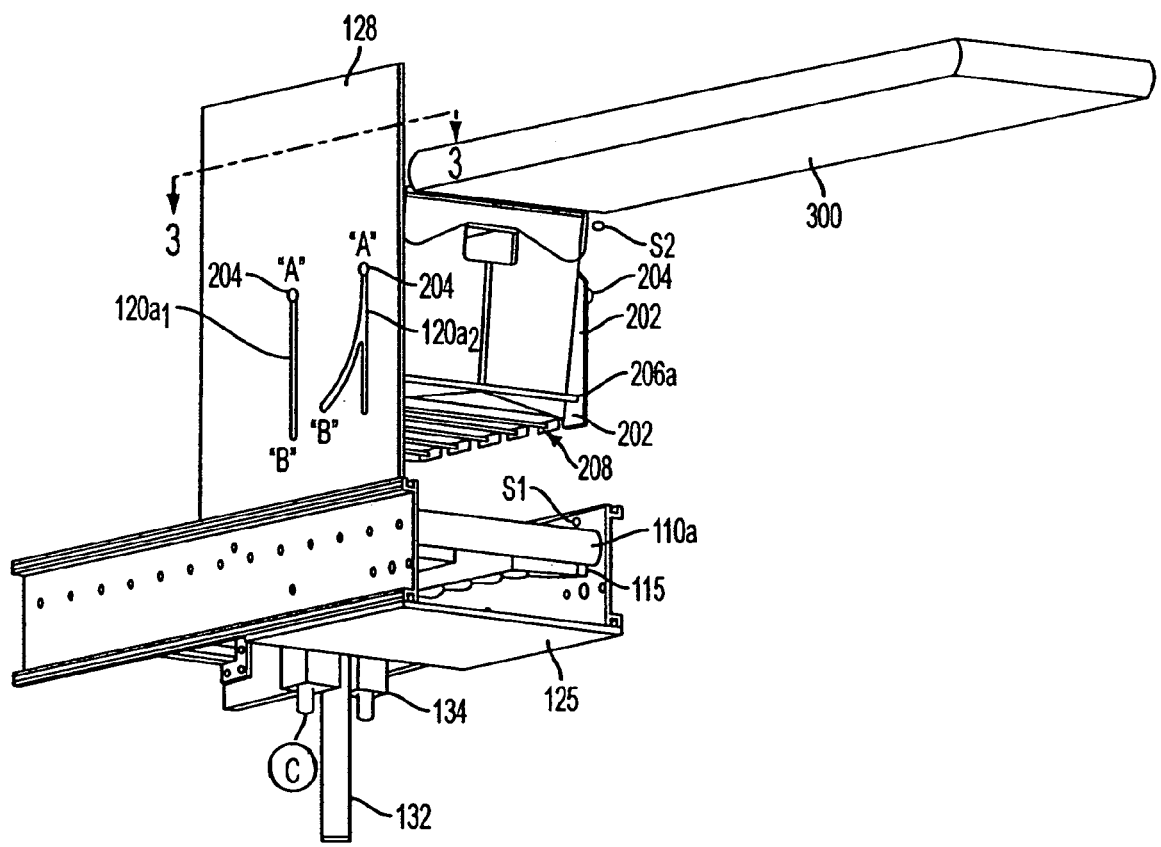
FIG. 3 shows the tray positioning device in a third position in accordance with the invention.
Figure 4:
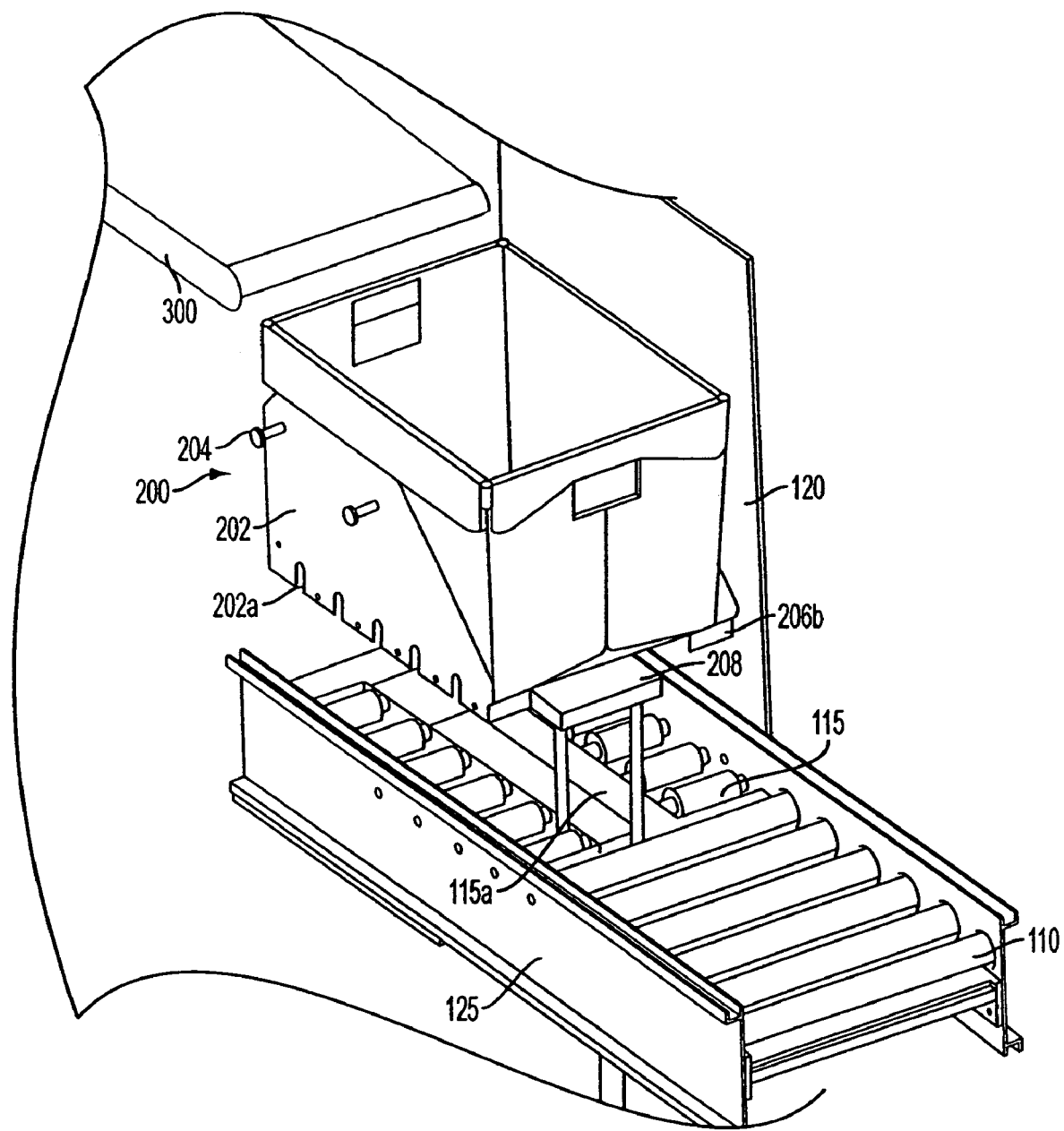
FIG. 4 shows a sectional view of the tray position device along line 3-3 of FIG. 3 in accordance with the invention.
Figure 5:
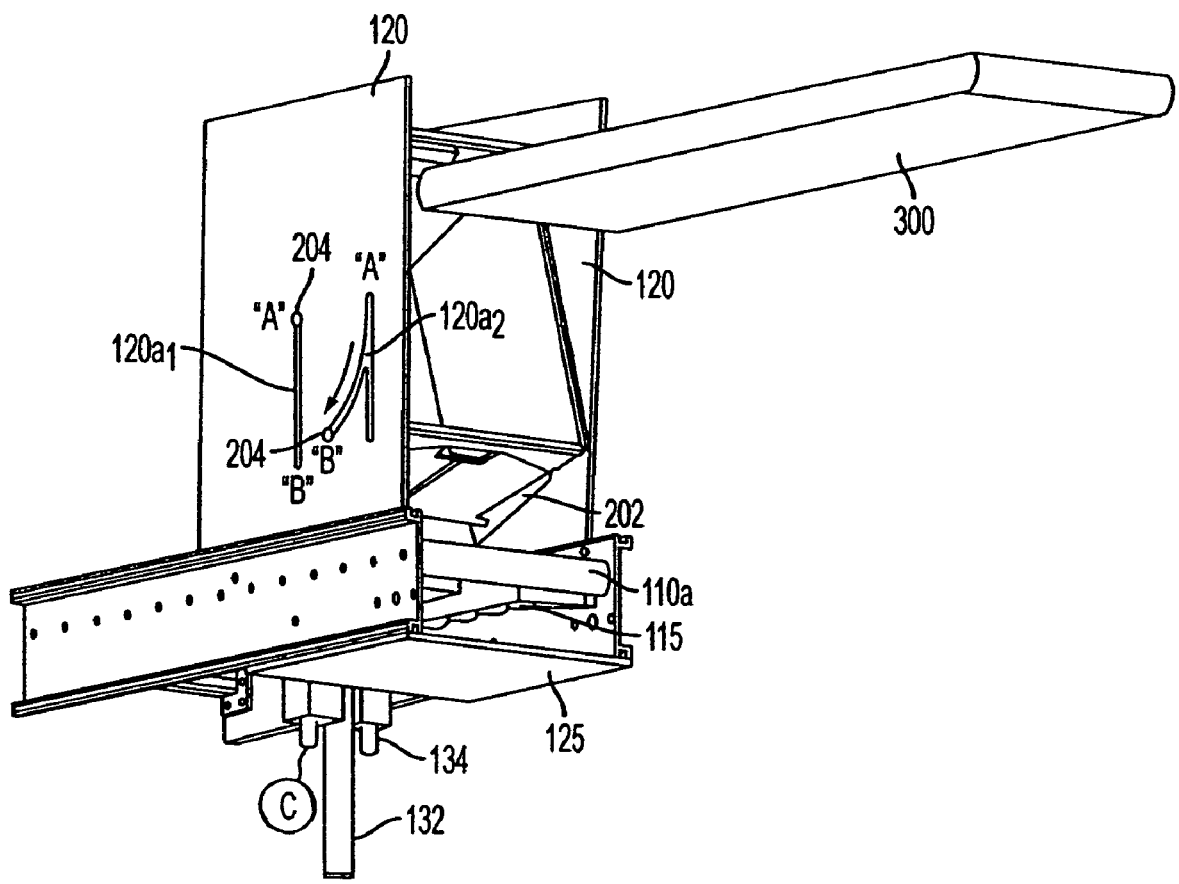
FIG. 5 shows the tray positioning device in a fourth position in accordance with the invention.
Figure 6:
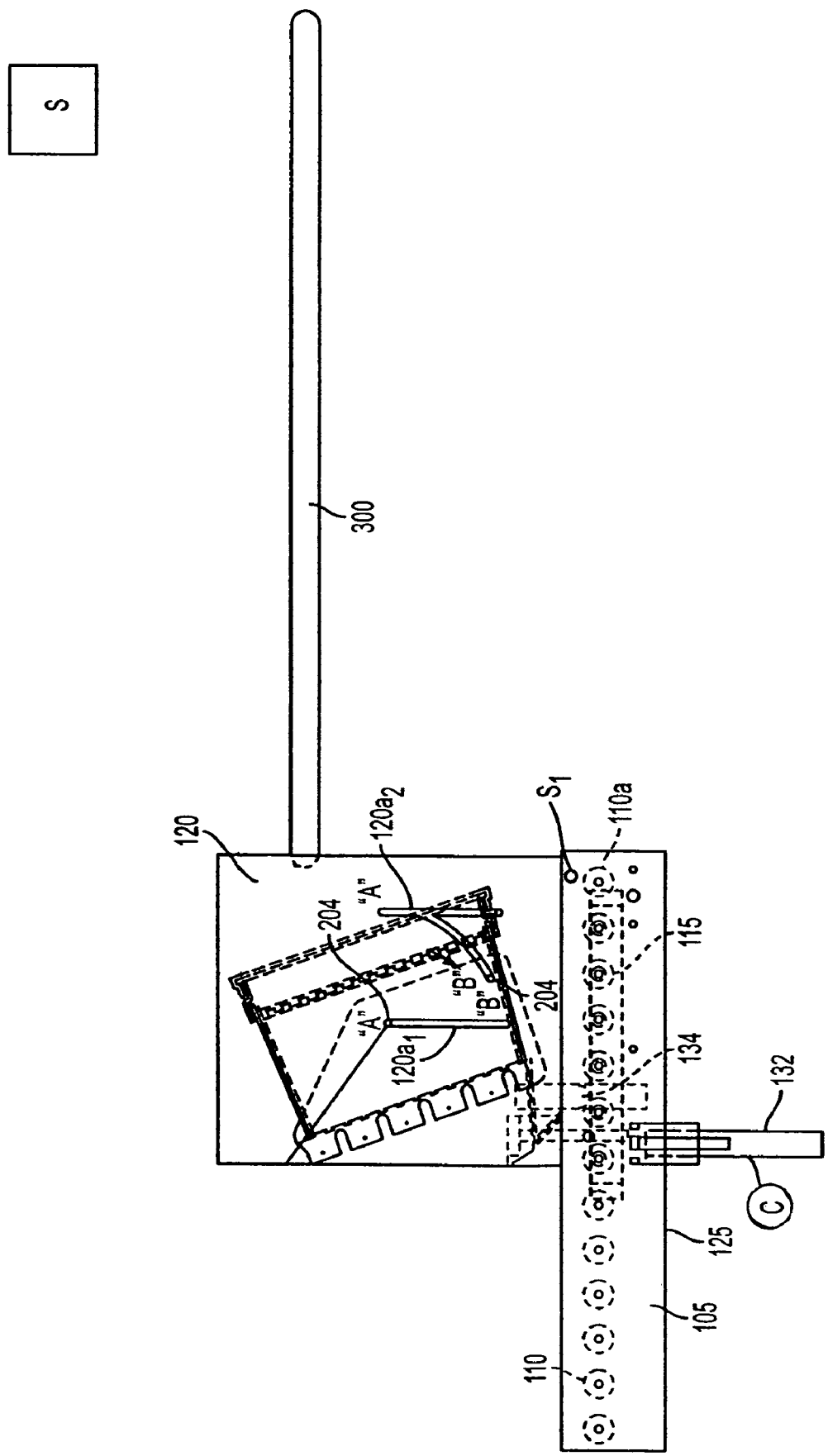
FIG. 6 shows another view of the tray positioning device in the fourth position in accordance with the invention.

The actuator assembly 130 is a multi-axis lifting mechanism fixed between the tray carriage 200 and the frame 125. The multi-axis lifting mechanism includes a linear actuator 132 and a rotary device and bell crank linkage system 134. The linear actuator 132 is designed to move the tray carriage 200 into a parked position (FIG. 1), a pop up position (FIG. 2) and a raised position (FIGS. 3 and 4). The linear actuator 132 may be an air cylinder, hydraulic system, rack and pinion gear, or other linear lifting device. The rotary device and bell crank linkage system 134 is mounted between the linear actuator 132, via a mounting bracket 136, and a side panel 202 of the tray carriage 200. In an alternative design, the bell crank linkage may extend between the segmented rollers 115 to an underside of the tray carriage 200. The rotary device and bell crank linkage system 134 move the tray carriage 200 into an inclined position for vertical stacking of product in the tray (FIGS. 5 and 6). The inclined orientation of the tray carriage 200 may be approximately 60° to 70° from the horizontal; although, other angles are also contemplated by invention.

Still referring to FIG. 1, the tray carriage 200 is positioned between opposing guide plates 120. A single guide plate 120, located on a side of the tray carriage 200, is also contemplated by the invention. The guide plate(s) 120 includes grooves or cutouts 120a which act as guides and stops (e.g., limiters) for pins or other types of projections 204, extending from the side panels 202 of the tray carriage 200, e.g., the pins 204 are slidably engaged with the grooves 120a. In one implementation, the grooves 120a include a substantially vertical groove $120a_1$ and a camber shaped groove $120a_2$. The camber shaped groove $120a_2$ includes a substantially vertical portion and a curved position.

The tray carriage 200 further includes a plurality of notches 202a which align with axles of the segmented rollers 115. By having the notches 202a, preferably on the side panels 202, in one implementation, the tray carriage 200 can be positioned or located below a contacting or transporting surface of the segmented rollers 115, i.e., nested or recessed within the segmented rollers 115. The tray carriage 200 further includes a front stop mechanism 206a and a rear stop mechanism 206b. The stop mechanisms 206a and 206b may be, for example, a rod, knob or other mechanism, extending above a supporting surface 208 of the tray carriage 200. In the nested position,
(i) the stop mechanisms 206a and 206b are positioned below the transporting surface of the conveyor;
(ii) the supporting surface 208, which may be cross bars or other surface, is nested between the segmented rollers 115; and
(iii) the tray can be moved onto and removed from the tray carriage 200 without any interference from the front stop mechanism 206a and the rear stop mechanism 206b.

FIG. 1 further shows several sensors provided in communication with a controller "C". The controller "C" may coordinate the movements of the tray carriage between the positions of FIGS. 1-6. Additionally, the sensors may be used to, for example, determine a height of the tray carriage, a load of product with the tray and the like. For example, a sensor $S_1$, e.g., a photodiode, may be provided proximate to the stop mechanism 206a and a sensor $S_2$, e.g., a photodiode, proximity switch or the like, is positioned approximately at the level the belt transport 300. The sensor $S_2$ may also be a limit switch, encoder or other type of sensor, all of which are used to determine the height of the tray, when the tray carriage is in the raised position of FIG. 3, for example. The sensor $S_2$ may also be a weight sensor used to determine when the tray is filled with product or, alternatively, a thickness measurement device to measure the thickness of the product prior to induction into the tray.

Figure 2:
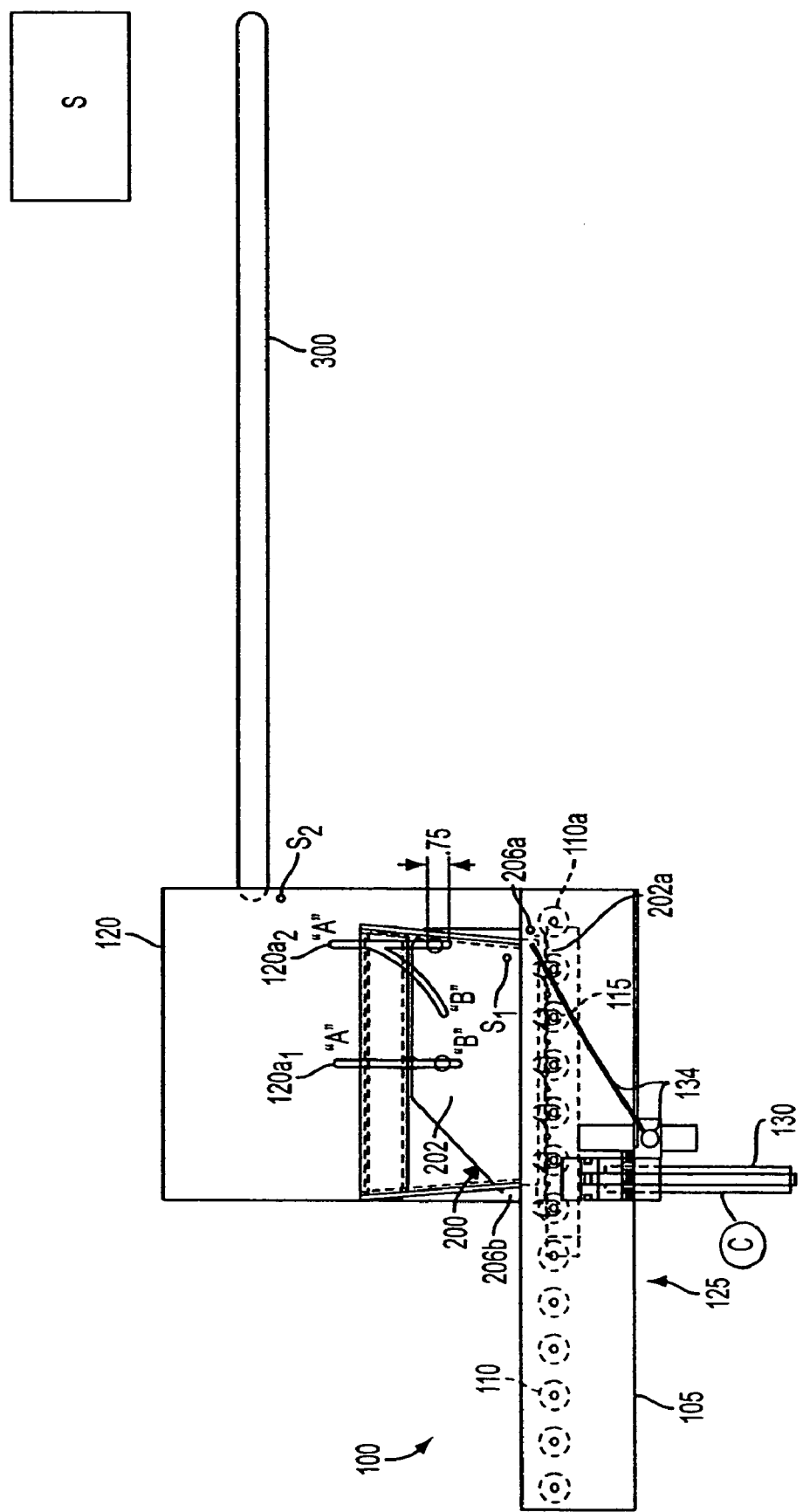
FIG. 2 shows the tray positioning device in a second position in accordance with the invention.

FIG. 2 shows the tray carriage 200 in a pop-up position. In this pop-up position, the tray carriage 200 is slightly raised, for example, by approximately 0.75 inches. In this position, though, the tray carriage 200 may remain nested between the segmented rollers 115 of the conveyor. In this slightly raised position, the stop mechanism 206a, raised slightly above the segmented rollers 115, acts as a stop when the tray is being moved onto the tray carriage 200; that is, the front stop mechanism 206a, now being at a height higher than the segmented rollers 115, will ensure, amongst other features, that the tray is properly registered or positioned on the tray carriage 200. The rear stop mechanism 206b, though, remains positioned at or below the transporting surface so as to not interfere with the loading of the tray onto the tray carriage 200 in the pop-up position. In this operational stage, the tray is resting on the segmented rollers 115.

FIG. 3 shows the tray carriage 200 in a raised position for horizontal stacking operations. In this illustration, the actuator assembly 130 and, more particularly, the linear actuator 132 raises the tray carriage 200 into the upper position such that the open portion of the tray is at a substantially same level as the delivery belt 300. In one embodiment of the invention, the upper edge of the tray is slightly below the delivery belt 300, by approximately 0.50 inches, and the edge of the tray is approximately 0.75 inches away from an edge of the delivery belt 300. As shown, the front stop mechanism 206a of the tray carriage 200 is slightly raised above the supporting surface 208 such that a leading edge of the tray contacts the front stop mechanism 206a. In this configuration, the tray cannot tumble forward. It should be understood that the front stop mechanism 206a (and the rear stop mechanism 206b) may be adjustable, manually or automatically, between several different positions.

In the horizontal stacking operational stage, the pins 202 slide within the vertical groove $120a_1$ and vertical portion of the camber shaped groove $120a_2$ to an upper position "A". The upper portion of the groove is a limiter or stop for the travel of the tray carriage, thus ensuring that the tray is positioned at a predetermined height during the horizontal stacking operations. During the stacking, the height of the front stop mechanism 206a and the rear stop mechanism 206b ensures that the tray will be securely positioned on the tray carriage 200 during this operation.

FIG. 4 is a cross sectional view of the positioning device 100 in the position shown in FIG. 3. FIG. 4 shows that the side panels 202 include extending pins 204, in additional to the notches 202a. The notches 202 align with the axles of the segmented rollers 115 so that, in the lowered position of FIG. 1, for example, the tray carriage 200 can be nested in the conveyor. Also, the guide plates 120 may be mounted to the frame 125 on opposing sides of the tray carriage 200. The stop mechanisms 206b are also alternatively shown as opposing, inwardly extending protuberances extending from the side panels 202 of the tray carriage 200.

Still referring to FIG. 4, the segmented rollers 115, in one embodiment, may include a space 115a between them designed to accommodate the mechanics of the linear actuator 132 and rotary device and bell crank linkage system 134. In such a configuration, the segmented rollers 115 will not mechanically interfere with the linear actuator 132, or the rotary device and bell crank linkage system 134 when they mounted to an underside of the tray carriage 200. Additionally, the supporting surface 208 may also be nested within this space 115a, when the tray carriage is in the position of FIG. 1. In this configuration, the supporting surface may be a planar, solid or substantially solid surface, instead of cross bars.

FIGS. 5 and 6 show the tray carriage in a vertical stacking operational stage. In this operational stage, the rotary device and bell crank linkage system 134 are energized to rotate the tray carriage 200 from the position of FIG. 4 to the inclined position of FIG. 5 (or FIG. 6). As shown in FIG. 6, the bell crank linkage is reduced, via motion of the rotary portion of the rotary device and bell crank linkage system 134. In this operational stage, one of the pins 204 is guided in the camber portion of the camber shaped groove $120a_2$, in the direction of the arrow to position "B"; whereas, the other pin 204 remains in the upper position "A" of the vertical groove $120a_1$ and acts as a pivot or rotation point. Accordingly, in this operational stage, as the tray carriage rotates about position "A" of the vertical groove $120a_1$ and the pin 204 is moved along arrow to position "B" along the camber shaped groove $120a_2$, the tray carriage 200, and hence the tray, will be moved into the inclined position for stacking product in the vertical orientation.

Use of the Invention

The system of the invention may be used for a single carrier route at a time, multiple routes at once or for warehousing or other sequencing needs of products. Also, some or all of the different operational stages shown in FIGS. 1-6 may be coordinated by the controller "C", and performed synchronously or asynchronously with two or more of the systems described herein.

Initially, the tray carriage is in a lowered position, for example, in the position represented in FIG. 1. The tray carriage is then slightly raised to a position of FIG. 2. In this operational stage, the tray is transported onto the tray carriage, via the power rollers. During the tray loading operation, the tray carriage may be slightly raised such that the stop mechanism is positioned above the power roller. In this slightly raised position, the front stop mechanism will prevent the tray from contacting the raised, front power roller and thus prevent the tray from exiting the tray carriage. Also, in this slightly raised position, the front stop mechanism will assist in the proper registration and alignment of the tray within the tray carriage. That is, the front stop mechanism will allow the power rollers to remain energized, pushing the tray onto the tray carriage while ensuring that the tray will move only to the stop mechanism, which is in a loading position alignment.

The tray carriage will then be lifted to position of FIG. 3. In the horizontal stacking operational stage, the belt drive will be activated to transport the product from the sorting and sequencing device, for example, to the tray. The height of the front stop mechanism and the rear stop mechanism ensures that the tray will be securely positioned on the tray carriage during this operation. Also, the grooves in the guide plates will act as stops or limiters in order to ensure that the tray carriage is positioned at a proper height. An encoder may also accomplish this same function. The guide plates also ensure that the product falls into the tray, in case the product is misaligned on the belt conveyor, i.e., the guide plates block the product from falling from the system.

The sensor $S_2$ (photodiode, proximity switch or the like) will determine when the tray is full or at another predetermined height. Once this determination is made, the tray carriage will bring the tray to the position of FIG. 1. Thereafter, the tray will be removed from the tray carriage, and the process may begin again, depending on whether additional product needs to be placed in the tray.

To vertically stack the product, the tray carriage is moved to the raised, horizontal position of FIG. 3. In addition, the tray carriage is then moved to the position of FIG. 5. This latter movement may take place by the rotary motion and subsequent reduction of the rotary actuator linked by the bell crank linkage to the tray carriage. Again, the grooves in the guide plates act as stops or limiters for the movement of the tray carriage. Additionally, the height of the front stop mechanism and the rear stop mechanism ensures that the tray will be securely positioned on the tray carriage during this operation.

The sensor $S_2$ will determine when the tray is full or at another predetermined height. Once this determination is made, the tray carriage will bring the tray to the position of FIG. 1, via the position of FIG. 3. Thereafter, the tray will be removed from the tray carriage, and the process may again begin, depending on whether additional product needs to be placed in the tray.

While the invention has been described in terms of embodiments, those skilled in the art will recognize that the invention can be practiced with modification within the spirit and scope of the appended claims.

It is claimed:

1. A system for positioning a tray, comprising:
a stationary conveyor for transporting the tray; and
a tray carriage in a tray transportation path with the conveyor and nestable within a transporting surface of the conveyor, the tray carriage being moveable from a lowered position to an elevated product-receiving position for stacking product in a horizontal orientation in the tray and to an inclined product-receiving position for stacking the product in a vertical orientation in the tray, wherein a front bottom edge of the tray carriage in the elevated product-receiving position is above the front bottom edge when the tray carriage is in the inclined product-receiving position.

2. The system of claim 1, further comprising a mechanism to move the tray carriage to the elevated product-receiving position and the product-receiving inclined position.

3. The system of claim 1, further comprising:
a first sensor to determine a registration of a tray on the tray carriage; and
a second sensor to:
determine a tray load condition to coordinate induction of product in the tray, or
determine a tray position in order to coordinate movement of the tray carriage.

4. The system of claim 1, wherein the inclined product-receiving position is approximately 60 degrees to 70 degrees with respect to a horizontal supporting surface.

5. The system of claim 1, further comprising:
a linear actuator for moving the tray carriage to the elevated product-receiving position; and
a rotary and linkage system for moving the tray carriage from the elevated product-receiving position to the inclined product-receiving position.

6. The system of claim 1, wherein the product is mail pieces.

7. The system of claim 1, wherein the elevated product-receiving position and the inclined product-receiving position are different positions of the tray carriage.

8. The system of claim 1, wherein the elevated product-receiving position is a horizontal, elevated product-receiving position.

9. The system of claim 1, wherein the tray carriage further comprises a plurality of notches, wherein when the tray carriage is nested within the transporting surface of the conveyor, the plurality of notches align with axles of segmented rollers of the conveyor.

10. A system for positioning a tray, comprising:
a stationary conveyor for transporting the tray; and
a tray carriage in a tray transportation path with the conveyor, the tray carriage being moveable from a lowered position to an elevated product-receiving position for stacking product in a horizontal orientation in the tray and to an inclined product-receiving position for stacking the product in a vertical orientation in the tray, wherein a front bottom edge of the tray carriage in the elevated product-receiving position is above the front bottom edge when the tray carriage is in the inclined product-receiving position wherein:
the tray carriage includes a supporting surface;
a raised stop mechanism, with respect to the supporting surface, proximate an ejection region of the tray carriage;
the supporting surface and the raised stop mechanism are nested below a transporting surface of the conveyor when the tray carriage is in the lowered position; and
the raised stop mechanism prevents the tray from being ejected from the tray carriage when the tray carriage begins to be raised or is in the elevated product-receiving position or the inclined product-receiving position.

11. A system for positioning a tray, comprising:
a stationary conveyor for transporting the tray; and
a tray carriage in a tray transportation path with the conveyor, the tray carriage being moveable from a lowered position to an elevated product-receiving position for stacking product in a horizontal orientation in the tray and to an inclined product-receiving position for stacking the product in a vertical orientation in the tray wherein the tray carriage comprises:
a supporting surface;
side walls having notches extending therefrom, the notches allowing the supporting surface to be nested with a transporting surface of the conveyor when the tray carriage is in the lowered position;
at least one raised mechanism positioned at an entrance and an ejection position of the tray carriage; and
at least one guide pin to guide the tray carriage to either of the elevated product-receiving position or the inclined product-receiving position.

12. A system for positioning a tray, comprising:
a stationary conveyor for transporting the tray; and
a tray carriage in a tray transportation path with the conveyor, the tray carriage being moveable from a lowered position to an elevated product-receiving position for stacking product in a horizontal orientation in the tray and to an inclined product-receiving position for stacking the product in a vertical orientation in the tray, wherein a front bottom edge of the tray carriage in the elevated product-receiving position is above the front bottom edge when the tray carriage is in the inclined product-receiving position, and further comprising:
a supporting surface, nestable with a transporting surface of the conveyor;
opposing side walls;
guide pins extending from the opposing side walls; and
at least one guide plate having one or more guides, the guide pins communicating with the one or more guides for guiding the tray carriage to the elevated product-receiving position and the inclined product-receiving position.

13. The system of claim 12, wherein the one or more guides includes:
a substantially vertical groove or a slit; and
a cambered groove or a slit, wherein:
the tray carriage rotates about at least one guide pin at an upper portion of the vertical groove or the slit when the tray carriage is being moved into the inclined product-receiving position;
the vertical groove or the slit limits movement of the tray carriage in a vertical direction; and
the cambered groove or the slit limits movement of the tray carriage in a downward, inclined direction.

14. The system of claim 13, wherein the cambered groove or slit includes a first substantially vertical portion and a second curved portion, extending from a location on the substantially vertical portion.

15. The system of claim 14, wherein the first substantially vertical portion and the second curved portion share a common portion.

16. The system of claim 14, wherein the second curved portion extends away from the first substantially vertical portion in a downward direction.

17. A system for positioning a tray, comprising:
a stationary conveyor for transporting the tray; and
a tray carriage in a tray transportation path with the conveyor and nestable within a transporting surface of the conveyor, the tray carriage being moveable from a lowered position to an elevated product-receiving position for stacking product in a horizontal orientation in the tray and to an inclined product-receiving position for stacking the product in a vertical orientation in the tray,
a delivery belt for induction of product to the tray; and
a controller coordinating movement of the product into the tray from the delivery belt when the tray carriage is in the elevated product-receiving position or the inclined product-receiving position.

18. A system for stacking product in a tray in either a horizontal orientation or a vertical orientation, comprising:
a stationary conveyor;
a tray carriage moveable from a nested position within a transporting surface of the conveyor to:
a raised, horizontal product-receiving position to stack the product in a horizontal orientation in the tray; and
a raised, inclined product-receiving position to stack the product in an inclined orientation in the tray; and
at least one raised mechanism for at least registering the tray on the tray carriage.

19. The system of claim 18, further comprising a controller to coordinate movement of the tray carriage to the raised, horizontal product-receiving position, the raised, inclined product-receiving position, a parked position and a pop-up raised position.

20. The system of claim 18, further comprising:
a linear actuator assembly for raising the tray carriage to the raised, horizontal product-receiving position; and
a rotary actuator assembly for moving the tray carriage to the raised, inclined product-receiving position after the tray carriage is in the raised, horizontal product-receiving position.

21. The system of claim 18, further comprising:
a delivery system for induction of product to the tray; and
a controller coordinating movement of the delivery system to induct product into the tray when the tray carriage is in the raised, horizontal product-receiving position or the raised, inclined product-receiving position.

22. The system of claim 18, wherein the product is mail pieces.

23. The system of claim 18, wherein the raised, horizontal product-receiving position and the raised, inclined product-receiving position are different positions of the tray carriage.

24. The system of claim 18, wherein a front bottom edge of the tray carriage in the raised, horizontal product-receiving position is above the front bottom edge when the tray carriage is in the raised, inclined product-receiving position.

25. A system for stacking product in a tray in either a horizontal orientation or a vertical orientation, comprising:
a stationary conveyor;
a tray carnage moveable from a nested position with respect to the conveyor to;
a raised, horizontal product-receiving position to stack the product in a horizontal orientation in the tray; and
a raised, inclined product-receiving position to stack the product in an inclined orientation in the tray; and
at least one raised mechanism for at least registering the tray on the tray carriage, wherein:
the at least one raised mechanism is a first raised mechanism and a second raised mechanism; wherein the first raised mechanism:
is located at an ejection region of the tray carriage;
is at a height above a supporting surface of the tray carriage;
is nested with a transporting surface of the conveyor when the tray carriage is in the nested position; and
prevents the tray from exiting the tray carriage when the tray carriage is in a first raised position, the raised, horizontal product-receiving position or the raised, inclined product-receiving position; and
the second raised mechanism is recessed within a portion of the conveyor when the tray carriage is in the nested position and prevents the tray from exiting the tray carriage when the tray carriage is in the raised, horizontal product-receiving position or the raised, inclined product-receiving position.

26. A system for positioning a tray, comprising:
a stationary conveyor for transporting the tray; and
a tray carriage in a tray transportation path with the conveyor and nestable within a transporting surface of the conveyor,
means for moving the tray carriage from a lowered position to an elevated horizontal product-receiving position and for receiving product in a horizontal orientation in the tray; and
means for moving the tray carriage to an inclined product-receiving position and for receiving the product in a vertical orientation in the tray.

* * * * *

UNITED STATES PATENT AND TRADEMARK OFFICE
CERTIFICATE OF CORRECTION

PATENT NO. : 7,475,520 B2 Page 1 of 1
APPLICATION NO. : 11/097277
DATED : January 13, 2009
INVENTOR(S) : J. Swider et al.

It is certified that error appears in the above-identified patent and that said Letters Patent is hereby corrected as shown below:

At column 10, line 14 (claim 25, line 5) of the printed patent, ";" should be -- : --.

Signed and Sealed this

Twenty-fourth Day of March, 2009

JOHN DOLL
*Acting Director of the United States Patent and Trademark Office*